(12) United States Patent
Balakrishnan et al.

(10) Patent No.: US 11,288,177 B2
(45) Date of Patent: Mar. 29, 2022

(54) SYSTEMS AND METHODS FOR MOBILE APPLICATION ACCESSIBILITY TESTING

(71) Applicant: JPMORGAN CHASE BANK, N.A., New York, NY (US)

(72) Inventors: Swaroop Kumar Balakrishnan, Bengaluru (IN); Rameshkumar Appusamy, Bengaluru (IN); Naveen Kumar Marathi, Bangalore (IN); Naveen Kumar Ponnuswamy, Bangalore (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 243 days.

(21) Appl. No.: 16/507,151

(22) Filed: Jul. 10, 2019

(65) Prior Publication Data

US 2021/0011841 A1    Jan. 14, 2021

(51) Int. Cl.
| | | |
|---|---|---|
| *G06F 11/00* | (2006.01) | |
| *G06F 11/36* | (2006.01) | |
| *G06F 13/42* | (2006.01) | |

(52) U.S. Cl.
CPC ...... *G06F 11/3692* (2013.01); *G06F 11/3664* (2013.01); *G06F 11/3688* (2013.01); *G06F 13/4282* (2013.01); *G06F 2213/0042* (2013.01)

(58) Field of Classification Search
CPC ............. G06F 11/3644; G06F 11/3664; G06F 11/3668; G06F 11/3692
See application file for complete search history.

(56) References Cited

U.S. PATENT DOCUMENTS

| | | | | |
|---|---|---|---|---|
| 9,367,415 | B1* | 6/2016 | Lachwani | G06F 11/3684 |
| 9,645,910 | B1* | 5/2017 | Kaila | G06F 9/45516 |
| 10,296,444 | B1* | 5/2019 | Choudhary | G06F 11/3664 |
| 2015/0058826 | A1* | 2/2015 | Hu | G06F 11/3664 |
| | | | | 717/128 |
| 2015/0378864 | A1* | 12/2015 | Lensmar | G06F 11/3414 |
| | | | | 717/130 |
| 2016/0202960 | A1* | 7/2016 | Minh Le | G06F 8/40 |
| | | | | 717/158 |
| 2019/0220262 | A1* | 7/2019 | Fox | G06F 8/41 |

(Continued)

OTHER PUBLICATIONS

Eler et al., "Automated Accessibility Testing of Mobile Apps", 2018 IEEE 11th International Conference of Software Testing, Verification and Validation, pp. 116-126 (Year: 2018).*

(Continued)

*Primary Examiner* — Michael Maskulinski
(74) *Attorney, Agent, or Firm* — Greenberg Traurig LLP

(57) ABSTRACT

Systems and methods for mobile application accessibility testing are disclosed. According to one embodiment, in a test bench comprising at least one computer processor, a method for mobile application accessibility testing may include: (1) identifying an accessibility checkpoint for testing; (2) generating a test command for the accessibility checkpoint; (3) communicating the test command to a mobile electronic device, the mobile electronic device having a mobile application to be tested, an instrument application, and probe application in a memory thereof; (4) executing the test command on the mobile application to be tested using the instrument application; and (5) collecting results of the execution using the probe application.

17 Claims, 2 Drawing Sheets

(56) References Cited

U.S. PATENT DOCUMENTS

2019/0227909 A1* 7/2019 Kwong ................ G06F 40/143
2019/0227917 A1* 7/2019 Henry ................ G06F 11/3664

OTHER PUBLICATIONS

"Test your app's accessibility", https://developer.android.com/guide/topics/ui/accessibility/testing, last updated Oct. 28, 2020 (Year: 2020).*
Siebra et al., "An Analysis on Tools for Accessibility Evaluation in Mobile Applications", SBES 2018, Sep. 17-21, 2018, pp. 172-177 (Year: 2018).*
Zelenchuk, Denys, Android Espresso Revealed, https://doi.org/10.1007/978-1-4842-4315-2_1, Chapter 1—Getting Started with Espresso for Android, first available online Mar. 2, 2019, pp. 1-48 (Year: 2019).*
Whitaker, Rob, Developing Inclusive Mobile Apps, https://doi.org/10.1007/978-1-4842-5814-9_11, first available online Apr. 26, 2020, Chapter 11—Testing for Accessibility, pp. 269-289 (Year: 2020).*
Vontell, Aaron, "Bility: Automated Accessibility Testing for Mobile Applications", Thesis submitted at the Massachusetts Institute of Technology, Feb. 2019, pp. 1-90 (Year: 2019).*

* cited by examiner

SYSTEMS AND METHODS FOR MOBILE APPLICATION ACCESSIBILITY TESTING

BACKGROUND OF THE INVENTION

1. Field of the Invention

Embodiments are directed to systems and methods for mobile application accessibility testing.

2. Description of the Related Art

Mobile applications are often tested for accessibility issues during development. For example, mobile applications may be tested to make sure that they comply with interactive accessibility requirements of The Americans with Disabilities Act (ADA) and/or other accessibility standards, such as The Twenty-First Century Communications And Video Accessibility Act.

SUMMARY OF THE INVENTION

Systems and methods for mobile application accessibility testing are disclosed. According to one embodiment, in a test bench comprising at least one computer processor, a method for mobile application accessibility testing may include: (1) identifying an accessibility checkpoint for testing; (2) generating a test command for the accessibility checkpoint; (3) communicating the test command to a mobile electronic device, the mobile electronic device having a mobile application to be tested, an instrument application, and probe application in a memory thereof; (4) executing the test command on the mobile application to be tested using the instrument application; and (5) collecting results of the execution using the probe application.

In one embodiment, the method may further include installing the instrument application and the probe application on the mobile electronic device.

In one embodiment, the test bench and the mobile device may communicate using a universal serial bus connection.

In one embodiment, the method may further include mapping the results of the execution to the checkpoint.

In one embodiment, a plurality of checkpoints may be identified for testing, and the method further comprising aggregating the results for the plurality of checkpoints.

In one embodiment, the method may further include converting the results from a first format to a second format; and saving the results in the second format. The first format may be JSON, and the second format may be HTML.

In one embodiment, the checkpoint may test at least one of a user interface, a voiceover, entry of a gesture, and feedback.

According to another embodiment, a system for mobile application accessibility testing may include a test bench comprising at least one computer processor, the test bench executing a checkpoint executor, and a mobile electronic device comprising at least one mobile device computer processor and a memory, the memory having a mobile application to be tested, an instrument application, and probe application therein. The checkpoint executor may identify an accessibility checkpoint for testing and may generate a test command for the accessibility checkpoint. The test bench may communicate the test command to the mobile electronic device using a device interface. The mobile electronic device may receive the test command using a device socket. The instrument application may receive and execute the test command on the mobile application to be tested. The probe application may collect results of the execution.

In one embodiment, the test bench and the mobile device may communicate using a universal serial bus connection.

In one embodiment, the test bench may map the results of the execution to the checkpoint.

In one embodiment, a plurality of checkpoints may be identified for testing, and the results for the plurality of checkpoints may be aggregated.

In one embodiment, the test bench may convert the results from a first format to a second format and saves the results in the second format. The first format may be JSON, and the second format may be HTML.

In one embodiment, the checkpoint may test at least one of a user interface, a voiceover, entry of a gesture, and feedback.

According to another embodiment, in a mobile electronic device comprising at least one computer processor and a memory, the memory having a mobile application to be tested, an instrument application, and probe application therein, a method for mobile application accessibility testing may include: (1) receiving, from a test bench, a test command for an accessibility checkpoint for testing the mobile application; (2) executing the test command on the mobile application to be tested using the instrument application; and (3) collecting results of the execution using the probe application.

In one embodiment, the test bench and the mobile device may communicate using a universal serial bus connection.

In one embodiment, the checkpoint may test at least one of a user interface, a voiceover, entry of a gesture, and feedback.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

The present disclosure generally relates to systems and methods for mobile application accessibility testing.

Figure 1:
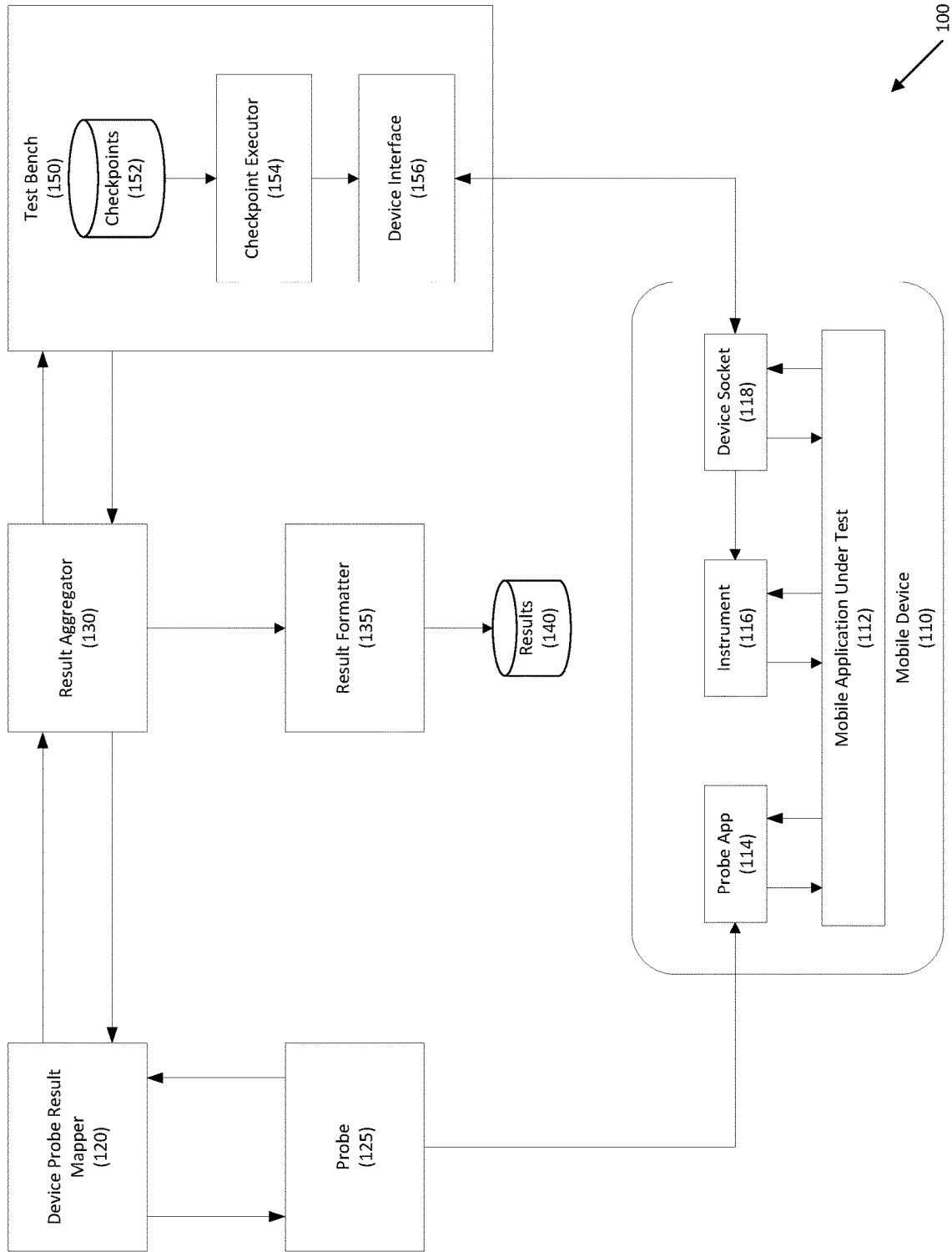
FIG. 1 depicts a system for mobile application accessibility testing according to one embodiment.

Referring to FIG. 1, a system for mobile application accessibility testing is disclosed according to one embodiment. System 100 may include mobile device 110 which may execute mobile application under test 112. System 110 may further include test bench 150, which may be hosted by an electronic device (e.g., computer, workstation, server, etc.) that may store checkpoint database 152, which may include accessibility test parameters. Test bench 150 may further include checkpoint executor 154 which may retrieve checkpoints from checkpoint database 152, generate a command for the checkpoint(s), and may communicate the command to mobile device 110 using device interface 156.

Checkpoint database 152 may store accessibility requirements that mobile application under test 112 is to comply with. Examples include checks against the user interface, voiceovers, gestures, etc.

Mobile device 110 may communicate with device interface 156 using device socket 118, which may communicate the test commands to mobile application under test 112. Moreover, device socket 118 may communicate with instrument app 116.

Instrument app 116 may execute the test commands on mobile application under test 116.

Probe app 114 may be installed on mobile device 110, and probe 125 may monitor and may receive test results from probe app 114. In one embodiment, the test results may be provided in a format, such as JSON.

For example, in an Android environment, probe app may monitor the TalkBack accessibility feature.

Probe 125 may communicate with device probe result mapper 120, which may map the results from probe app 114 to the checkpoint(s) under test. Results aggregator 130 may aggregate the test results and provide the results to result formatter 135, which may format the test results in a second format, such as html.

In one embodiment, device interface 156 and device socket 118, and probe 125 and probe app 114, may communicate using a wired connection, such as a USB connection. In one embodiment, device interface 156 and device socket 118, and probe 125 and probe app 114, may share a common USB connection.

In one embodiment, test results may be aggregated at the conclusion of the tests executed by checkpoint executor 154.

In one embodiment, device probe result mapper 120, probe 125, results aggregator 130, results formatter 135, and test bench 150 may be provided on a single computer, workstation, server, cloud, etc. In another embodiment, these elements may be provided on two or more computer, workstation, server, cloud, etc.

Figure 2:
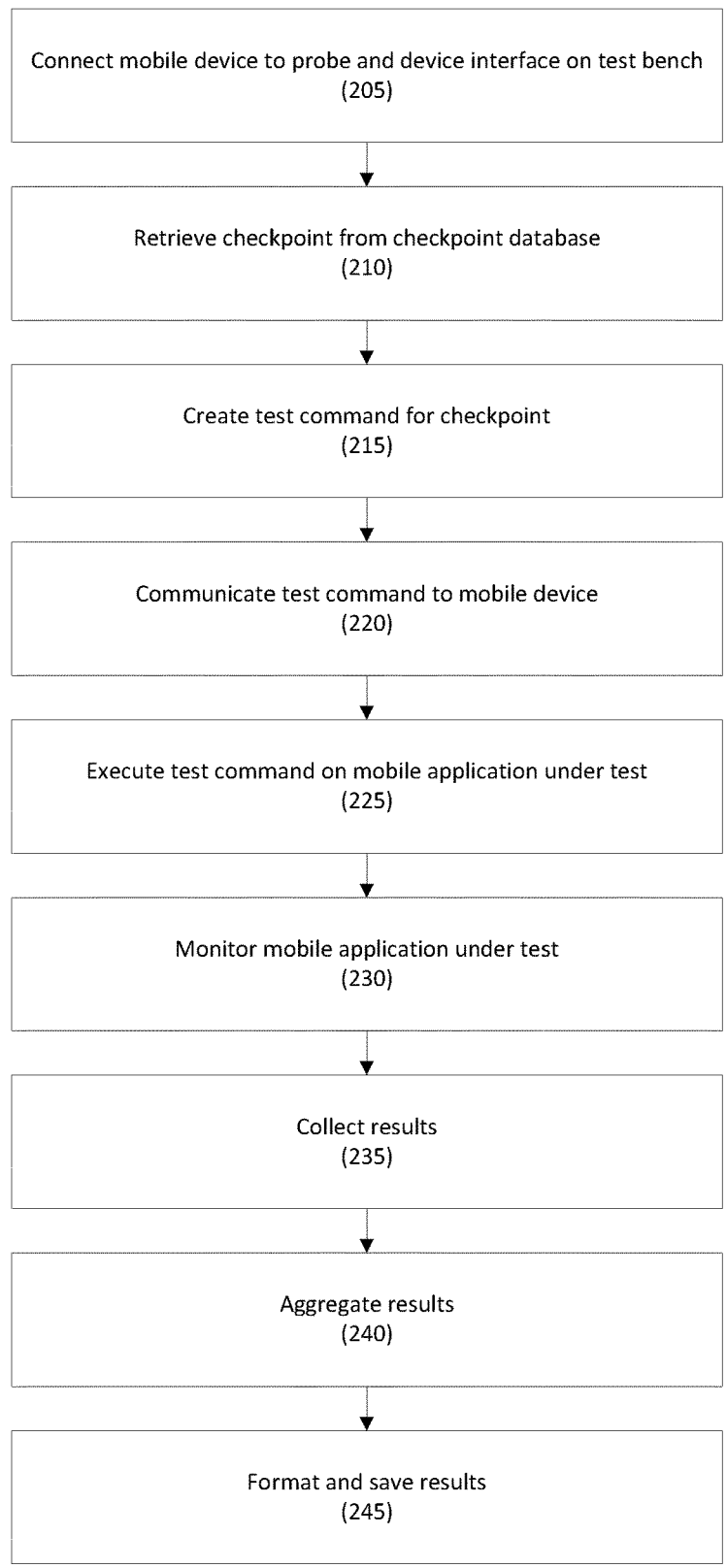
FIG. 2 depicts a method for mobile application accessibility testing according to one embodiment.

Referring to FIG. 2, a method for mobile application accessibility testing is disclosed according to one embodiment.

In step 205, a mobile device with a mobile application to be tested may be connected to a test bench. In one embodiment, the test bench may include a computer (e.g., desktop computer, laptop computer, workstation, server, cloud-based system, etc.).

In one embodiment, the mobile device may have one or more application installed thereon, including, for example, an instrument application for interacting with the application to be tested, a probe application for monitoring and collecting data in response to the test, etc.

In one embodiment, the test bench may interact with the mobile device using a wired connection (e.g., a USB cord), by a wireless connection, by a combination, etc.

In step 210, one or more accessibility checkpoints to test the mobile application for compliance with may be selected. In one embodiment, the checkpoint(s) may be selected using a user interface and may be retrieved from a checkpoint database.

In one embodiment, the checkpoints may be used to validate the mobile application's compliance with regulations, policies, etc. with regard to accessibility.

In step 215, a test command for each selected checkpoint may be created. For example, a checkpoint executor may generate the test command. In one embodiment, the test command may be static, hard-coded logic for each checkpoint.

In step 220, the test command may be communicated to the mobile application to be tested. In one embodiment, the checkpoint executor may communicate the test command to the mobile application via an interface in the test bench to a device socket on the mobile device.

In step 225, the test command may be executed on the mobile application under test. In one embodiment, the instrument application may execute the test command. For example, the instrument application may simulate the user interacting with the mobile application under test.

In step 230, the mobile application under test may be monitored for its response to the test command. In one embodiment, the probe application may monitor services executed by the mobile device's operating system such as TalkBack on the Android operating system, may be monitored. Other services, such as gesture entry, keyboard entry, feedback, etc. may be monitored as is necessary and/or desired.

In step 235, the results of the test command may be collected. In one embodiment, the probe application may collect the results and provide them for mapping to the test command that the result is associated with.

In step 240, the results may be aggregated. For example, once all test commands are complete for the session, the results may be aggregated into a single file.

In step 245, the aggregated results may be formatted and stored. In one embodiment, the results may be collected and aggregated in a first format (e.g., JSON), and may be saved in a second format (e.g., HTML) for viewing and analysis.

Although several embodiments have been disclosed, it should be recognized that these embodiments are not mutually exclusive, and features from one embodiment may be used with others.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for mobile application accessibility testing, comprising:
   in a test bench comprising at least one computer processor:
      identifying an accessibility checkpoint for testing;
      generating a test command for the accessibility checkpoint;
      communicating the test command to a mobile electronic device, the mobile electronic device having a mobile application to be tested, an instrument application, and probe application in a memory thereof;
      executing the test command on the mobile application to be tested using the instrument application;
      collecting results of the execution using the probe application;
      converting the results from a first format to a second format; and
      saving the results in the second format.

2. The method of claim 1, further comprising:
   installing the instrument application and the probe application on the mobile electronic device.

3. The method of claim 1, wherein the test bench and the mobile electronic device communicate using a universal serial bus connection.

4. The method of claim 1, further comprising:
   mapping the results of the execution to the accessibility checkpoint.

5. The method of claim 1, wherein a plurality of checkpoints are identified for testing, and the method further comprising aggregating the results for the plurality of checkpoints.

6. The method of claim 1, wherein the first format is JSON, and the second format is HTML.

7. The method of claim 1, wherein the checkpoint tests at least one of a user interface, a voiceover, entry of a gesture, and feedback.

8. A system for mobile application accessibility testing, comprising:
   a test bench comprising at least one computer processor, the test bench executing a checkpoint executor; and
   a mobile electronic device comprising at least one mobile device computer processor and a memory, the memory having a mobile application to be tested, an instrument application, and probe application therein;
   wherein:
      the checkpoint executor identifies an accessibility checkpoint for testing;
      the checkpoint executor generates a test command for the accessibility checkpoint;
      the test bench communicates the test command to the mobile electronic device using a device interface;
      the mobile electronic device receives the test command using a device socket;
      the instrument application receives and executes the test command on the mobile application to be tested;
      the probe application collects results of the execution; and
      the test bench converts the results from a first format to a second format and saves the results in the second format.

9. The system of claim 8, wherein the test bench and the mobile electronic device communicate using a universal serial bus connection.

10. The system of claim 8, wherein the test bench maps the results of the execution to the accessibility checkpoint.

11. The system of claim 8, wherein a plurality of checkpoints are identified for testing, and the results for the plurality of checkpoints are aggregated.

12. The system of claim 8, wherein the first format is JSON, and the second format is HTML.

13. The system of claim 8, wherein the checkpoint tests at least one of a user interface, a voiceover, entry of a gesture, and feedback.

14. A method for mobile application accessibility testing, comprising:

in a mobile electronic device comprising at least one computer processor and a memory, the memory having a mobile application to be tested, an instrument application, and probe application therein:
- receiving, from a test bench, a test command for an accessibility checkpoint for testing the mobile application, wherein a checkpoint executor executed by the test bench identifies the accessibility checkpoint for testing and generates the test command for the accessibility checkpoint;
- executing the test command on the mobile application to be tested using the instrument application; and
- collecting results of the execution using the probe application;

wherein the test bench is configured to convert the results from a first format to a second format and save the results in the second format.

15. The method of claim 14, wherein the test bench and the mobile electronic device communicate using a universal serial bus connection.

16. The method of claim 14, wherein the accessibility checkpoint tests at least one of a user interface, a voiceover, entry of a gesture, and feedback.

17. The method of claim 14, wherein the first format is JSON, and the second format is HTML.

* * * * *